April 25, 1939. W. J. VOIT Re. 21,063

METHOD OF MAKING BALLS

Original Filed Jan. 7, 1936

INVENTOR
WILLIAM J. VOIT
BY
Floyd H. Harris
ATTORNEY.

Reissued Apr. 25, 1939

Re. 21,063

UNITED STATES PATENT OFFICE 21,063

METHOD OF MAKING BALLS

William J. Voit, Los Angeles, Calif.

Original No. 2,127,487, dated August 16, 1938, Serial No. 95,088, August 10, 1936, which is a division of Serial No. 57,907, January 7, 1936. Application for reissue October 24, 1938, Serial No. 236,830

8 Claims. (Cl. 154—16)

My invention relates to game balls, and relates in particular to a method of making balls, the invention being particularly adapted to the making of balls of the character of baseballs having a casing or cover enclosing a core or center of compacted fibrous material.

Game balls of this character have been extensively manufactured with leather covers consisting generally of two cooperating pieces of leather each having an outline resembling the numeral 8, secured in place on the center of the ball by use of seams, or in such a manner as to include seams formed by the abutting edges of the cooperating leather pieces, such edges being generally secured together by the use of a characteristic back-and-forth stitch which has come to be known as the "baseball stitch". The technique of games played with these balls has been in some measure developed around the characteristics of the balls. For example, a leather covered ball having a filled center has certain characteristics of rebound, flight, and handling. When struck with a bat with a given force, the standard leather covered baseball will be impelled at a speed determined by or corresponding to its characteristics of weight, resilience, and external formation. In view of the known characteristics of commonly used baseballs, the playing field, or diamond, and the rules of play have been given a desired relationship to the characteristics of the ball with which the game is played. The presence of the seam, and its stitches, has a definite influence on the action of the ball during flight and on the ability of the player or thrower to control the same, and accordingly it may be said that the manner of preparing the external surface of the ball has become a part of the game.

It is an object of my present invention to provide a method for making a ball of the general character set forth hereinabove, which ball may be used in the place of a standard leather covered ball in the playing of a game of ball without changing the manner of playing or technique of the game. My new ball is characterized by being more durable and by the ability to keep its spherical shape longer than the standard leather covered ball, but has the same characteristics of flight and handling as a leather covered ball which it replaces, these characteristics being accomplished by giving the surface of the ball the same general form as found on the surface of a leather covered ball, namely, the same seams and stitching, and the same character of surface finish between the seams.

It is a further object of the invention to provide a method of making a game ball having a center of suitable composition of fibrous character and being equipped with a rubber cover, molded in place and having the surface form set forth in the preceding paragraph, which game ball will outlast or outwear leather covered balls in the place of which its use is intended.

This application is a division of my pending application Serial No. 57,907, filed January 7, 1936, for "Ball and method of making the same."

Further objects and advantages of the invention will be made evident throughout the following part of the specification.

Referring to the drawing, which is for illustrative purposes only,

Figure 1:
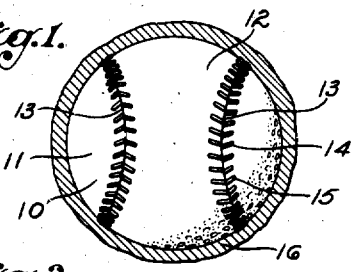
Fig. 1 is a partly sectioned view showing the manner in which a mold for making my new ball may be produced.

The first step in the practice of my invention is to form a ball 10 having a leather cover of conventional form consisting of two cooperating pieces 11 and 12 placed so that the edges thereof will come together at a seam or seams 13, these seams 13 being ordinarily secured by thread stitches 14 crossing back and forth between the edges of the leather pieces 11 and 12. In view of the fact that the thread 15 from which the stitches 14 are formed passes intermittently under the edges of the pieces 11 and 12, the seams 13 are given a raised effect on the surface of the ball 10.

Figure 2:
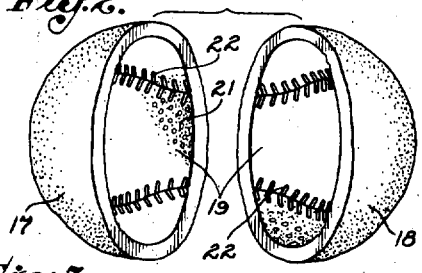
Fig. 2 is a view showing the mold divided.

The leather covered ball 10 is then sprayed with metal so as to produce a metal shell 16 covering the entire ball 10 to a desired thickness. The shell 16, as shown in Fig. 2, is then divided on a medial plane, and the ball 10 is removed therefrom, leaving two cooperating mold parts 17 and 18 consisting of the two halves of the shell 16, the interior surfaces 19 of the mold parts 17 and 18 having the form or configuration imparted thereto by the ball 10 as the result of coating the ball 10 with metal in such a manner that the metal fills all of the spaces or depressions in the surface of the ball. Accordingly, the surfaces 19 of the mold parts 17 and 18 are pebbled, as indicated at 21, in accordance with the grain surface of the leather pieces 11 and 12 of the ball 10, and the seams and stitches 13 and 14 of the original ball 10 are reresented by matrices 22 formed in the surfaces 19 of the parts 17 and 18. The surfaces 19 are in fact negative representations of the cooperating halves of the ball 10.

Figure 3:
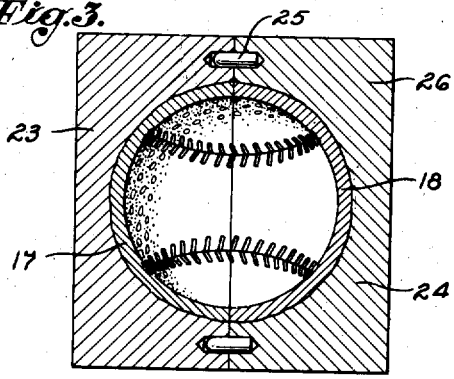
Fig. 3 is a view showing the mold reinforced and provided with aligning means.

As shown in Fig. 3, the mold parts 17 and 18 produced by dividing the shell 16 are mounted in metal bodies 23 and 24 so as to form a mold of separable character, and dowels 25 may be provided for the purpose of aligning the halves of the mold indicated in toto by the numeral 26.

Figure 4:
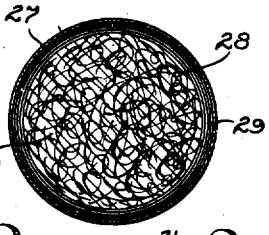
Fig. 4 is a view in cross section showing a center which may be used in the making of the new ball.

A ball core or center is then formed. One form of such center, as shown in Fig. 4, consists of a body 28 of fibrous material, such as kapok, wool, cotton waste, etc., with a surface layer of yarn 29 wound thereon, thereby producing a ball core or center 30 nearly as large as the original ball 10. To insure the adherence of the surface portion of the center 30 to the rubber cover to be subsequently applied, a coating 27 of rubber cement is applied to the winding of yarn 29, a portion of this cement penetrating into the yarn so that it will act to bind the separate turns of yarn together as well as to cement the surface turns of the yarn to the rubber cover.

Figure 5:
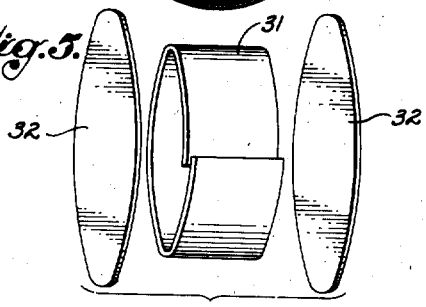
Fig. 5 is a view showing the rubber pieces which are to be applied to the surface of the center.
Figure 6:
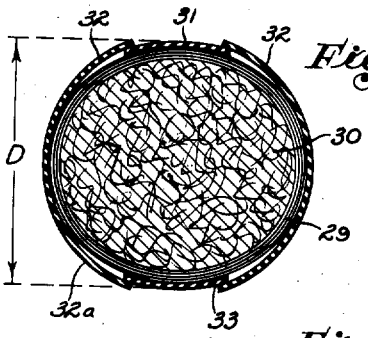
Fig. 6 is a sectional view showing a manner in which the rubber pieces may be applied to the center.

As shown in Figs. 5 and 6, rubber pieces 31 and 32 are placed upon the center 30 so as to completely cover the same. With relation to the volume of the center 30, the volume of the rubber constituting the rubber pieces 31 and 32 is such that the uncured ball shown in Fig. 6 will have a volume at least as great as, but preferably slightly greater than, the volume of the space within the mold so that when the mold is closed around the uncured ball, both the center 30 and the rubber constituting the pieces 31 and 32 will be placed under compression, thereby assuring that the rubber cover of the ball will be tight upon the filler or center 30. To make it possible to place the uncured ball shown in Fig. 6 in the mold 26 without shearing or injuring the rubber which has been placed on the surface of the center 30, the center 30 is deformed to elliptical or egg-shaped form, so that the smallest diameter of the uncured ball will be, as indicated by D in Fig. 6, slightly less than the diameter of the spherical cavity of the mold. The rubber pieces 31 and 32 are made from a vulcanizable rubber compound, and the piece 31 is preferably in the form of a strip which may be wound centrally around the center 30, as shown in Fig. 6, the pieces 32 being preferably in the form of discs adapted to be cupped over the exposed portions of the center, as shown at 32a in Fig. 6, the pieces 31 and 32 being of such size that the edges thereof will overlap as indicated at 33.

Figure 7:
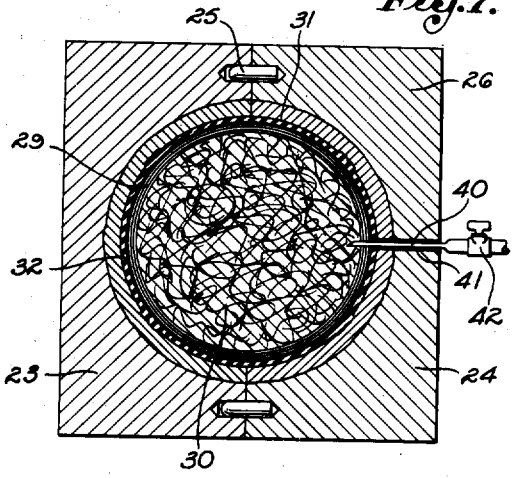
Fig. 7 is a sectional view showing the ball in the mold.

The ball in its partly finished condition, as shown in Fig. 6, is then placed within the mold 26 with its equatorial plane of least diameter D coinciding with the plane of the abutting faces of the two halves 23 and 24 of the mold 26, as shown in Fig. 7. As the two halves 23 and 24 of the mold 26 are brought together, the center thereof, which was previously deformed to elongated or egg-shaped form, is pressed by the mold to spherical form, and in the preferred practice of the invention the closing of the mold 26 places the uncured ball under compression. To gain best results, the volume of the unfinished ball shown in Fig. 6, that is, the volume of the center 30 with the rubber pieces 31 and 32 thereon, should be at least as great as the volume of the interior space of the mold 26, or preferably slightly greater than the volume of the interior space of the mold, the result being that the center 30 will be compressed and will exert an outward force tending to hold the uncured rubber tightly against the inner faces 19 of the mold during the curing process. I also contemplate in the practice of my invention the use of a gas pressure within the ball to assure that the rubber cover will be properly extended against the mold surfaces. To compensate for any slight defects in the shape of the center 30, internal gas pressure may be produced in any of the known manners now employed in the manufacture of hollow rubber goods. Before removal of the ball from the mold, the gas pressure is released therefrom either by cooling the ball to normal temperature or by puncturing it with a bleeder needle. Illustrative of the step of bleeding gas pressure from the interior of the ball prior to its removal from the mold 26, I have in Fig. 7 shown a needle 40, of the character of a hypodermic needle, projecting through an opening 41 in the wall of the mold part 24 and also through the rubber cover of the ball. The needle 40 is shown with a valve 42 associated therewith. Not only may the needle 40 be employed for relieving gas pressure within the ball before removing it from the mold, but it may be also employed as a means for initially creating a gas pressure within the ball. For example, after the uncured ball is placed in the mold 26, air under pressure may be delivered into the interior of the uncured ball through the needle 40 so as to provide the auxiliary gas pressure within the ball which will force such portions of the rubber which have not already been forced outwardly by the center 30 into positive engagement with the interior walls of the mold 26.

Figure 8:
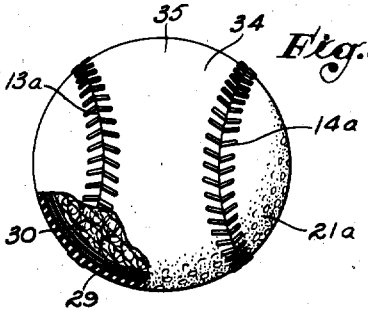
Fig. 8 is a partly sectioned view of a preferred embodiment of my new game ball.

In Fig. 8, I show the finished ball 34 which now has a continuous spherical rubber cover 35 molded in place on the center 30 and cementitiously adhering to the center 30. Under the heat of curing to which it is subjected within the mold 26, the vulcanizable rubber of the pieces 31 and 32 is formed into a continuous homogeneous layer. The rubber cover 35 has no actual seams, but due to the curing of the same in the mold previously described herein, a surface is produced which is a replica of the surface of the original ball 10; that is, it has replicas 13a of the seams 13, has replicas 14a of the stitches 14 or the threads which formed the original stitches 14, and in addition thereto has a surface 21a exposed between the replicas 13a of the seams pebbled or grained in exact duplicate of the surfaces of the leather pieces 11 and 12 of the original ball 10. This ball 34, with the exception that it has a one-piece molded rubber cover and is in this respect superior to a leather covered ball, has all of the characteristics of the standard or conventional approved leather covered ball, and may be used in games requiring the use of an approved leather covered ball. It will in no manner change the playing of the game, but will have the added advantage of retaining its shape for a maximum period of time and resisting skinning or scuffing of its surface. Having no sewed seams to be broken by severe usage or to become opened by the wearing of the threads, the ball will last for a much longer period of time than the approved leather covered ball which it is to replace.

I claim as my invention:

1. A method of making a rubber covered substantially solid article, including the steps of: forming a core comprising air-pervious material, placing vulcanizable rubber cover material about said air-pervious core, inserting said air-pervious core and rubber in a mold so that said rubber completely surrounds said core, injecting air under a desired pressure through said rubber into said air-pervious core to thereby force said rubber into intimate contact with said mold, applying heat to vulcanize said rubber while maintaining said pressure, relieving said pressure after vulcanization, and removing the finished article from said mold.

2. A method of making a baseball including the steps of: forming a ball-center comprising compressible air-pervious material, placing rubber cover material about said ball-center, inserting said ball-center and rubber in a mold so that said rubber completely encloses said ball-center; injecting air under a desired pressure through said rubber material into said ball-center to force said rubber into intimate contact with said mold, applying heat to vulcanize said rubber while maintaining said pressure; relieving said pressure after vulcanization; and removing the finished ball from said mold.

3. A method of making a substantially solid ball including the steps of: forming a core from material pervious to air, winding a layer of elongated fibrous material about said core, placing vulcanizable rubber cover material around the wound core, inserting said wound core and rubber in a mold having a cavity of less volume than that of said wound core and rubber, closing said mold to thereby compress said wound core and rubber, injecting air under a desired pressure into said core to force said rubber into engagement with said mold, applying heat to vulcanize said rubber while maintaining said pressure, relieving said pressure after vulcanization, opening said mold and removing the finished ball from said mold.

4. A method of making an indoor baseball including the steps of: forming a core from compressible fibrous material pervious to air, winding a layer of yarn about said core, placing vulcanizable rubber cover material about said wound core, placing said wound core and rubber in a mold, closing said mold, inserting a hollow needle through said rubber into said core, injecting air under a desired pressure through said needle into said core to thereby force said rubber into intimate contact with said mold, applying heat to cure said rubber while maintaining said pressure, relieving said pressure through said needle, withdrawing said needle from said core, opening said mold and removing the finished ball from said mold.

5. A method of making a substantially solid athletic ball including the steps of: taking a completed ball-center comprising material pervious to air or the like, applying vulcanizable rubber about the exterior of said ball-center, placing said ball-center and rubber in a mold, establishing pressure in said ball-center by means other than the compressive action of the mold to force said rubber into intimate contact with said mold, applying sufficient heat to vulcanize said rubber about said ball-center while said pressure is effective, relieving said pressure, and removing the finished ball from said mold.

6. A method of making a rubber covered substantially solid article, including the steps of: forming a core comprising air-pervious material, placing vulcanizable rubber cover material about said air-pervious core, inserting said air-pervious core and rubber in a mold so that said rubber completely surrounds said core, the volume of said mold being appreciably less than the volume of said core and rubber, injecting air under a desired pressure through said rubber into said air-pervious core to thereby force said rubber into intimate contact with said mold, applying heat to vulcanize said rubber while maintaining said pressure, relieving said pressure after vulcanization, and removing the finished article from said mold.

7. A method of making a substantially solid ball including the steps of: forming a core from material pervious to air, placing vulcanizable rubber cover material around the core, inserting said core and rubber in a mold having a cavity of less volume than that of said core and rubber, closing said mold to thereby compress said core and rubber, injecting air under a desired pressure into said core to force said rubber into engagement with said mold, applying heat to vulcanize said rubber while maintaining said pressure, relieving said pressure after vulcanization, opening said mold and removing the finished ball from said mold.

8. A method of making a substantially solid athletic ball including the steps of: taking a completed ball-center comprising material pervious to air or the like, applying vulcanizable rubber about the exterior of said ball-center, placing said ball-center and rubber in a mold, the volume of said mold being appreciably less than said ball-center and rubber and the interior face of said mold being formed with a design of indentations and projections, establishing pressure in said ball-center by means other than the compressive action of the mold to force said rubber into intimate contact with said mold, applying sufficient heat to vulcanize said rubber about said ball-center while said pressure is effective, relieving said pressure, and removing the finished ball from said mold.

WILLIAM J. VOIT.